United States Patent
Reinking et al.

[15] 3,676,544
[45] July 11, 1972

[54] PROCESS FOR THE PRODUCTION OF POLYAMIDE MOULDINGS

[72] Inventors: Klaus Reinking, Krefeld; Helmut Vogel, Krefeld-Gartenstadt; Wilhelm Hechelhammer; Kurt Schneider, both of Krefeld-Bockum, all of Germany

[73] Assignee: Farbenfabriken Bayer Aktiengesellschaft, Leverkusen, Germany

[22] Filed: May 20, 1970

[21] Appl. No.: 39,140

[30] Foreign Application Priority Data

May 31, 1969 Germany ..................P 19 27 922.2

[52] U.S. Cl. ..........................264/329, 260/78 L, 264/331, 264/349
[51] Int. Cl. .......................................................B29f 1/08
[58] Field of Search ................260/78 L; 264/176, 331, 349, 264/329; 18/12 SH

[56] References Cited

UNITED STATES PATENTS

| | | | |
|---|---|---|---|
| 2,705,342 | 4/1955 | Hendry | 264/329 X |
| 3,309,343 | 3/1967 | Darnell | 260/857 X |

*Primary Examiner*—Robert F. White
*Assistant Examiner*—Allen M. Sokal
*Attorey*—Plumley & Tyner

[57] ABSTRACT

This invention relates to a process for the production of polyamide mouldings which comprises polymerizing a mixture consisting of a lactam, a catalyst and an activator in a screw injection moulding machine, said mixture being delivered to said screw injection moulding machine under the effect of an external pressure. The mixture is delivered at a pressure of at least 2 atms. under the influence of a pressure generator through a feed opening to the feed zone and a screw injection moulding machine and is polymerized in the injection moulding machine to form a polyamide at a temperature above the melting temperature of the polyamide and the resulting polyamide melt is forced by the injection moulding machine into a mould.

9 Claims, No Drawings

PROCESS FOR THE PRODUCTION OF POLYAMIDE MOULDINGS

This invention relates to a process for the production of polyamide mouldings by the activated anionic polymerization of lactams in a screw injection-moulding machine, followed by forming or shaping.

It is known that lactams containing more than 5 ring atoms can be polymerized by heating at temperatures above 130° C. in the presence of small quantities of alkaline catalysts and activators. This process can be used for the production of mouldings from polyamides when polymerization of the lactams is carried out in moulds heated to the polymerization temperature. The advantage of this process is that it is possible to obtain mouldings from polyamides of extremely high molecular weight which cannot be obtained in any other way. Disadvantages of the process include the long cycle times of the injection moulding machines, which render the process economic only for the production of large mouldings, and shrinkage or contraction during polymerization, which leads to the formation of bubbles in the moulding, particularly in the production of large mouldings.

The polymerization of lactams to form polyamides in screw injection-moulding machines involves various difficulties. It is known that lactams can be converted into polyamides by activated anionic polymerization in extruders. Whereas lactams can readily be polymerized in twin-screw extruders, the polymerization of lactams in single-screw extruders is adversely affected above all by the fact that, during polymerization, the ejection of polyamide is frequently interrupted by the discharge of non-polymerized lactam, especially when the residence time of the lactams in the extruder is limited at relatively high screw speeds, that is to say, when the time required for polymerization is short.

Even greater disadvantages had been expected in the polymerization of lactams on single-screw injection-moulding machines because these differ from the single-screw extruders in that the screws are displaced horizontally during operation.

It is an object of this invention to provide a process which prevents the above-mentioned disadvantages.

This object is accomplished by a process for the production of polyamide mouldings which comprises polymerizing a mixture consisting of a lactam, a catalyst and an activator in a screw injection moulding machine, said mixture is delivered to said screw injection moulding machine under the effect of an external pressure.

More particularly, the present invention provides a process for the production of polyamide mouldings by the ionic polymerization of lactams accompanied by forming or shaping in a screw injection-moulding machine, in which a polymerizable mixture of a lactam containing at least five carbon atoms, a basic catalyst and an activator is delivered to a screw injection-moulding machine through a feed opening thereof and is polymerized in the injection cylinder above the melting temperature of the polyamide formed, and the polyamide melt which is obtained is injected into a mould where it is cooled and from which it is subsequently released, wherein the polymerizable mixture is delivered to the feed zone of the screw as a liquid under a pressure of at least 2 atms., preferably from 4 to 8 atms., by means of a pressure generator into which the polymerizable mixture is introduced in solid form.

In the process according to the invention, the polymerizable mixture is fused either in the pressure generator itself, or in the feed opening immediately preceding the feed zone of the screw, depending upon the type of pressure generator used. Maintaining the pressure in the range specified is of crucial importance so far as the practical application of the process is concerned, because, firstly, it provides for delivery through the screw of the injection moulding machine and, secondly, because it prevents any non-polymerized lactam from leaving the injection cylinder.

The problem of feeding the lactams into the screw injection-moulding machines is solved by the process according to the invention. Normal screw injection-moulding machines can only accept and process granulated thermoplastic materials. They cannot accept or process lactams, for example caprolactam, which actually melt in the feed opening of the hot injection moulding machines. The reason for this is that only solid granular or powdered lactams can be accepted and processed by single screws; lactam melts cannot be accepted and processed because their melt viscosity is too low. In the process according to the invention, the lactams are delivered into the screw injection-moulding machine under the effect of external pressure. The low viscosity lactam melts are also delivered along the barrel of the injection moulding machine under the effect of this pressure, being heated to the polymerization temperature and polymerized. Accordingly, the production of mouldings from polyamides obtained by the polymerization of lactams, for example caprolactam, in injection-moulding machines is only possible by means of the process according to the invention.

The pressure required to feed the lactams into the injection moulding machines and to deliver the lactam melts into the injection moulding machines can be generated by means of different kinds of pressure generators. Pressure generators such as these include single-screw and double-screw extruders which deliver the lactams to be polymerized as solids into the feed opening of the injection moulding machines, or ram extruders through which the lactams to be polymerized are forced into the feed opening of the injection moulding machines in the form either of solids or of melts. Lactam melts may also be introduced into the injection moulding machines by means of pumps, for example gear pumps. The delivery of lactam melts from a supply vessel to the injection moulding machines may be carried out particularly easily under the pressure of gases, advantageously inert gases, for example nitrogen.

When screw extruders and gear pumps are used it is possible continuously to fill the injection moulding machines with polymerizable lactams.

The rate at which the lactams to be polymerized are delivered to the injection moulding machine is governed by the intensity of the pressure under which the lactam is introduced into the injection moulding machines. Accordingly, it is possible to vary the time available for polymerizing the lactam by varying the pressure.

One particular advantage of the process according to the invention is that the lactam mixture to be polymerized, containing an activator and a catalyst, may be used either in the form of a melt or even in the solid phase. It is particularly easy and advantageous to use solid polymerizable lactam mixtures because these mixtures are much easier to store than those in molten form.

The production of solid polymerizable mixtures such as these from lactams, catalysts and activators is known.

Any ionically polymerizable lactam, for example pyrrolidone, caprolactam, capryllactam, oenanthic lactam, ω-amino undecanic acid lactam, and lauric lactam, may be used in the process according to the invention. ε-Caprolactam may be used with particular advantage.

Any of the basic catalysts normally used for the anionic polymerization of lactams, for example alkali metal alcoholates, alkali metal salts of carboxylic acids and alkali metal borohydrides, are particularly suitable for use as catalysts. The alkali metal lactamate, especially the sodium lactamate of the particular lactam to be polymerized, is particularly suitable.

Any of the activators normally used for the ionic polymerization of lactams may be used as activators in the process according to the invention. Isocyanates and compounds which yield isocyanates at elevated temperature are particularly suitable. The addition products of isocyanates with lactams are especially preferred.

The following examples are to further illustrate the invention without limiting it.

EXAMPLE 1

Polymerization is carried out in a screw injection-moulding machine 80 mm in diameter with a length of 10 D, whose screw is a three-zone screw. A twin-screw extruder with screws 25 mm in diameter and 12 D long is attached to the feed opening. The cylinder of the screw injection-moulding machine is heated to 230° C. The screw of the screw injection-moulding machine is pushed up to the front stop. The nozzle of the injection moulding machine rests on the mould. The screw of the injection moulding machine rotates at 80 r.p.m., while the screws of the twin-screw extruder rotate at 40 r.p.m. A solid polymerizable mixture of $\epsilon$ - caprolactam containing 0.35 percent by weight of sodium lactamate and 1 percent by weight of $\epsilon$ -caprolactam-N-carboxylic acid-N'-phenyl amide, is introduced into the rear end of the twin-screw extruder. The twin-screw extruder delivers the mixture under a pressure of 6 atms. into the feed opening of the injection moulding machine where the mixture melts. The melt is taken in by the screw of the injection moulding machine under the pressure exerted by the extruder. At the same time, the melt is heated to 230° C. and polymerized. The viscous polyamide formed is delivered by the screw into the space preceding the end of the screw. Under the pressure building up there, the screw is displaced horizontally until it is back in contact with a predetermined stop. Once this stop has been reached, both the screw and the double-screws are stopped. The polyamide formed is forced into the mould by horizontally displacing the screw into its initial or starting position. The polyamide solidifies in the mould under the follow-up pressure exerted by the screw and after the next feed cycle is released from the mould. The screw and double-screw are then started up again, lactam mixture is taken in and polymerized into polyamide. The polyamide moulding formed in the mould is ejected at the end of each feed and polymerization cycle. The cycle time required to produce mouldings weighing 450 g is from 1 to 1.5 minutes.

EXAMPLE 2

Polymerization is carried out in the same injection moulding machine and under the same working conditions as in Example 1. The twin-screw extruder is replaced by a ram extruder whose ram can be hydraulically raised and lowered. The lower part of the cylinder of the cylinder of the ram extruder is with advantage heated to 100° C. The solid lactam mixture described in Example 1 is introduced sideways into the ram extruder below the raised ram. The ram is moved downwards during the feed cycle of the screw. As it moves downwards, it compresses the solid lactam which melts in the feed zone of the screw injection-moulding machine and is delivered under a pressure of from 6 to 8 atms. exerted by the ram extruder into the injection moulding machine, where polymerization takes place. In other respects, the polyamide mouldings are produced as in Example 1. The cycle time required to produce mouldings weighing 450 g varies from 1 to 1.5 minutes, depending upon the pressure exerted by the ram extruder.

EXAMPLE 3

The injection moulding machine used is the same as that used in the preceding Examples. Beneath the feed opening there is a gear pump above which there is a heated hopper whose lower cylindrical section is heated to 100° C. The polymerizable mixture of $\epsilon$ -caprolactam, activator and catalyst is introduced into the hopper. The mixture passes into the gear pump as the lactam melts. The gear pump pumps the melt into the injection moulding machine under a pressure of 6 atms. The gear pump only operates when the screw rotates, i.e. only during the feed and polymerization cycle. The polyamide mouldings are produced as described in Example 1.

What we claim is:

1. A process for the production of polyamide mouldings which comprises polymerizing a mixture, consisting essentially of a lactam having at least five carbon atoms, a basic catalyst and an activator, in a screw injection moulding machine wherein said mixture is delivered to said injection moulding machine at a pressure of at least 2 atmospheres under the influence of a pressure generator and is polymerized in said injection moulding machine to form a polyamide at a temperature above the melting temperature of the polyamide and the resulting polyamide melt is forced by the injection moulding machine into a mould.

2. The process is claimed in claim 1, wherein said lactam is caprolactam.

3. The process as claimed in claim 1, wherein said lactam is lauric lactam.

4. The process as claimed in claim 1, wherein the polymerizable mixture is fused in the feed opening immediately preceding the feed zone of the screw.

5. The process as claimed in claim 1, wherein said pressure generator is a screw extruder.

6. The process as claimed in claim 1, wherein said pressure generator is a piston pump.

7. The process as claimed in claim 1, wherein said pressure generator is a gear pump.

8. The process as claimed in claim 1, wherein said pressure generator is a container under the excess pressure of an inert gas.

9. The process as claimed in claim 1, wherein said pressure is from 4 to 8 atms.

* * * * *